US008326713B2

(12) United States Patent
Deliwala et al.

(10) Patent No.: US 8,326,713 B2
(45) Date of Patent: *Dec. 4, 2012

(54) METHOD AND SYSTEM FOR TECHNOLOGY CONSUMPTION MANAGEMENT INCLUDING ALLOCATION OF FEES

(75) Inventors: Manish K. Deliwala, Chandler, AZ (US); Ashish Goulatia, Peoria, AZ (US); Noreen Williams, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 935 days.

This patent is subject to a terminal disclaimer.

(21) Appl. No.: 10/708,566

(22) Filed: Mar. 11, 2004

(65) Prior Publication Data

US 2004/0215536 A1    Oct. 28, 2004

Related U.S. Application Data

(63) Continuation-in-part of application No. 10/628,731, filed on Jul. 28, 2003.

(60) Provisional application No. 60/463,474, filed on Apr. 16, 2003.

(51) Int. Cl.
*G06F 15/02* (2006.01)
*G06Q 40/00* (2012.01)

(52) U.S. Cl. ............................................. 705/32; 705/40

(58) Field of Classification Search .................... 705/34, 705/40

See application file for complete search history.

(56) References Cited

U.S. PATENT DOCUMENTS

| 5,253,166 | A | 10/1993 | Dettelbach et al. |
| 5,717,865 | A | 2/1998 | Stratmann |
| 5,832,451 | A | 11/1998 | Flake et al. |
| 5,910,987 | A | * 6/1999 | Ginter et al. .................... 705/52 |
| 5,963,939 | A | 10/1999 | McCann et al. |
| 5,991,741 | A | 11/1999 | Speakman et al. |

(Continued)

FOREIGN PATENT DOCUMENTS

JP    2004110577    8/2004

(Continued)

OTHER PUBLICATIONS

"Core One Credit Union—Discover the Advantage", < http://coreone.org/2visa.html >, Copyright 2001, (Last Visited Oct. 9, 2002).

(Continued)

*Primary Examiner* — Fahd Obeid
(74) *Attorney, Agent, or Firm* — Snell & Wilmer L.L.P.

(57) ABSTRACT

The invention facilitates monitoring, identifying, allocating and distributing the costs related to the consumption of raw technology resources by an organization. The invention provides a controller for automatically billing a designated account, project, division or third party for fees associated with the computing time, use or other similar services. The system may utilize a rules engine or any other factors for dividing the billings. The system may provide loyalty points for computer usage or accept loyalty points to pay for computer usage. The system may also monitor use in substantially real-time or provide notifications and warnings related to low or excessive use. Enhanced descriptive billing statements can be created simplifying the process of reconciling fees to the computing costs. The system may also compile usage statistics and send out requests for bids to obtain improved financial arrangements or to share usage with other entities.

18 Claims, 3 Drawing Sheets

U.S. PATENT DOCUMENTS

| | | | |
|---|---|---|---|
| 6,009,408 A | 12/1999 | Buchanan | |
| 6,023,679 A | 2/2000 | Acebo et al. | |
| 6,072,493 A | 6/2000 | Driskell et al. | |
| 6,125,354 A * | 9/2000 | MacFarlane et al. | 705/34 |
| 6,128,602 A | 10/2000 | Northington et al. | |
| 6,169,979 B1 | 1/2001 | Johnson | |
| 6,195,643 B1 | 2/2001 | Maxwell | |
| 6,219,654 B1 | 4/2001 | Ruffin | |
| 6,321,205 B1 | 11/2001 | Eder | |
| 6,411,936 B1 | 6/2002 | Sanders | |
| 6,442,526 B1 | 8/2002 | Vance et al. | |
| 6,453,269 B1 | 9/2002 | Quernemoen | |
| 6,519,823 B1 | 2/2003 | Sugata et al. | |
| 6,526,387 B1 | 2/2003 | Ruffin et al. | |
| 6,850,643 B1 | 2/2005 | Smith et al. | |
| 7,020,628 B2 * | 3/2006 | Peterson et al. | 705/32 |
| 7,050,986 B1 | 5/2006 | Vance et al. | |
| 7,054,823 B1 | 5/2006 | Briegs et al. | |
| 7,395,231 B2 | 7/2008 | Steury et al. | |
| 7,539,620 B2 | 5/2009 | Winterton et al. | |
| 7,617,136 B1 | 11/2009 | Lessing et al. | |
| 2001/0032123 A1 | 10/2001 | Burns et al. | |
| 2002/0007327 A1 | 1/2002 | Steury et al. | |
| 2002/0010686 A1 | 1/2002 | Whitesage | |
| 2002/0016729 A1 | 2/2002 | Breitenbach et al. | |
| 2002/0026416 A1 | 2/2002 | Provinse | |
| 2002/0069102 A1 | 6/2002 | Vellante et al. | |
| 2002/0091994 A1 | 7/2002 | McCready et al. | |
| 2002/0143590 A1 | 10/2002 | Dhong et al. | |
| 2002/0147676 A1 | 10/2002 | Karmali | |
| 2002/0169658 A1 | 11/2002 | Adler | |
| 2003/0046195 A1 | 3/2003 | Mao | |
| 2003/0061140 A1 | 3/2003 | Chen | |
| 2003/0149632 A1 | 8/2003 | Walker et al. | |
| 2003/0212617 A1 | 11/2003 | Stone et al. | |
| 2004/0035922 A1 * | 2/2004 | Cameron | 235/377 |
| 2004/0153348 A1 | 8/2004 | Garback | |
| 2005/0256737 A1 | 11/2005 | Liu | |
| 2005/0289025 A1 | 12/2005 | Fredericks et al. | |
| 2007/0016523 A1 | 1/2007 | Blair et al. | |

FOREIGN PATENT DOCUMENTS

| | | |
|---|---|---|
| WO | 0217201 | 2/2002 |

OTHER PUBLICATIONS

Liam Lahey, "Microsoft Bolsters Rebate Structure", Computer Dealer News (Feb. 8, 2002).
Joan Goldwasser, "Best of the Cash-back Cards", Kiplinger's Personal Finance Magazine (Apr. 1999).
Gordon Carey, "Multi-tier Copay", Pharmaceutical Executive (Feb. 2000).
"New Evidence about Positive Three-Tier Co-pay Performance Presented at Express Scripts 2000 Outcomes Conference", PR Newswire Association, Inc. (Jun. 28, 2000).
Eric Schmuckler, "Playing Your Cards Right", Forbes (Dec. 28, 1987).
Mary Kuntz, "Credit Cards as Good as Gold", Forbes (Nov. 4, 1985).
Judy Nyman, "Free Income Tax Clinics are Opening as Apr. 30 Deadline Draws Nearer", The Toronto Star (Mar. 25, 1986, Final Edition).
Michael Obel, "Oil Companies Push Marketing, Cost Cutting to Fortify Earnings", Oil & Gas Journal (Sep. 16, 1985).
"The Chase Manhattan Bank Today Announced a Comprehensive Program to Enhance the Value of All its Credit Cards", PR Newswire (Dec. 18, 1986).
"Credit Cards Offer Travelers New Benefit", PR Newswire (Aug. 5, 1987).
"Shell Introduces Optional Credit Card", The Associated Press (Sep. 3, 1985).
"Shell-Oil; Introduces Shell Signature Travel and Entertainment Credit Card", Business Wire (Sep. 3, 1985).
"Prestige Credit Cards: Those Pricey Plastics", Changing Times (Apr. 1986).
"Shell Introducing Expanded 'Signature' Credit Card", Tulsa Business Chronicle (Sep. 9, 1985).
USPTO; Office Action dated Oct. 3, 2007 in U.S. Appl. No. 10/628,731.
USPTO; Final Office Action dated Jun. 9, 2008 in U.S. Appl. No. 10/628,731.
USPTO; Advisory Action dated Oct. 17, 2008 in U.S. Appl. No. 10/628,731.
USPTO; Office Action dated Dec. 18, 2008 in U.S. Appl. No. 10/628,731.
USPTO; Final Office Action dated Jun. 19, 2009 in U.S. Appl. No. 10/628,731.
USPTO; Advisory Action dated Oct. 28, 2009 in U.S. Appl. No. 10/628,731.
USPTO; Office Action dated Nov. 24, 2009 in U.S. Appl. No. 10/628,731.
USPTO; Final Office Action dated Apr. 29, 2010 in U.S. Appl. No. 10/628,731.
USPTO; Advisory Action dated Jul. 9, 2010 in U.S. Appl. No. 10/628,731.
USPTO; Office Action dated Nov. 17, 2010 in U.S. Appl. No. 10/628,731.
USPTO; Office Action dated Jan. 10, 2008 in U.S. Appl. No. 11/289,228.
USPTO; Office Action dated Sep. 16, 2008 in U.S. Appl. No. 11/289,228.
USPTO; Office Action dated May 27, 2009 in U.S. Appl. No. 11/289,228.
USPTO; Office Action dated Nov. 24, 2009 in U.S. Appl. No. 11/289,228.
USPTO; Office Action dated Apr. 13, 2010 in U.S. Appl. No. 11/289,228.
USPTO; Final Office Action dated Sep. 30, 2010 in U.S. Appl. No. 11/289,228.
USPTO; Advisory Action dated Dec. 8, 2010 in U.S. Appl. No. 11/289,228.
USPTO; Office Action dated Jan. 6, 2011 in U.S. Appl. No. 11/289,228.
USPTO; Final Office Action dated Jul. 11, 2011 in U.S. Appl. No. 11/289,228.
USPTO; Office Action dated Feb. 4, 2009 in U.S. Appl. No. 11/042,663.
USPTO; Final Office Action dated Aug. 20, 2009 in U.S. Appl. No. 11/042,663.
USPTO; Advisory Action dated Dec. 1, 2009 in U.S. Appl. No. 11/042,663.
USPTO; Office Action dated May 10, 2010 in U.S. Appl. No. 11/042,663.
USPTO; Final Office Action dated Oct. 29, 2010 in U.S. Appl. No. 11/042,663.
USPTO; Advisory Action dated Jan. 28, 2011 in U.S. Appl. No. 11/042,663.
USPTO; Office Action dated Mar. 25, 2011 in U.S. Appl. No. 11/042,663.
USPTO; Final Office Action dated Aug. 2, 2011 in U.S. Appl. No. 11/042,663.
AU; First Examiner's Report dated Mar. 30, 2010 in Application No. 2005271396.
AU; Second Examiner's Report dated Aug. 24, 2010 in Application No. 2005271396.
EP; European Search Report dated Mar. 23, 2009 in Application No. 05778268.2.
EP; Examination Report dated Jun. 4, 2009 in Application No. 05778268.2.
JP; Office Action dated Mar. 18, 2011 in Application No. 2007-525003.
MX; Office Action dated Aug. 2009 in Application No. MX/a/2007/001488.
CO; Office Action dated Apr. 2009, in Application No. 07.011.478.
PCT; International Search Report dated Mar. 2, 2006 in Application No. PCT/US2005/027792.
PCT; Written Opinion dated Mar. 2, 2006 in Application No. PCT/US2005/027792.

PCT; International Preliminary Report on Patentability dated Feb. 6, 2007 in Application No. PCT/US2005/027792.
http://web.archive.org/web/20040213185624.www47.americanexpress.com/corporateservices/newsroom/press/press_26.asp.
USPTO; Final Office Action dated May 4, 2011 in U.S. Appl. No. 10/628,731.
USPTO; Advisory Action dated Aug. 2, 2011 in U.S. Appl. No. 10/628,731.
USPTO; Advisory Action dated Sep. 29, 2011 in U.S. Appl. No. 11/042,663.
USPTO; Office Action dated Nov. 23, 2011 in U.S. Appl. No. 11/042,663.
USPTO; Advisory Action dated Sep. 30, 2011 in U.S. Appl. No. 11/289,228.
USPTO; Office Action dated Nov. 14, 2011 in U.S. Appl. No. 11/289,228.
USPTO; Final Office Action dated Feb. 28, 2012 in U.S. Appl. No. 10/628,731.
USPTO; Final Office Action dated Apr. 19, 2012 in U.S. Appl. No. 11/042,663.
CR; Expert's Opinion received Feb. 3, 2012 in Application No. 8890.
USPTO; Office Action dated Nov. 25, 2011 in U.S. Appl. No. 10/628,731.
USPTO; Advisory Action dated May 9, 2012 in U.S. Appl. No. 10/628,731.
USPTO; Notice of Allowance dated Jun. 29, 2012 in U.S. Appl. No. 11/289,228.
USPTO; Advisory Action dated Jun. 28, 2012 in U.S. Appl. No. 11/042,663.

* cited by examiner

METHOD AND SYSTEM FOR TECHNOLOGY CONSUMPTION MANAGEMENT INCLUDING ALLOCATION OF FEES

CROSS REFERENCE TO RELATED APPLICATIONS

This application is a continuation-in-part of, and claims priority to, U.S. Ser. No. 10/628,731 filed on Jul. 28, 2003 and entitled "Method And System For Technology Consumption Management" (which itself claims priority to U.S. Provisional Application Ser. No. 60/463,474, filed Apr. 16, 2003), all of which are hereby incorporated by reference.

FIELD OF INVENTION

This application generally relates to managing the use of technology, and more particularly, to a method and system for monitoring, identifying, allocating and distributing the costs related to the consumption of raw technology resources by an organization to thereby increase the value of the technology to the organization and to help an organization ensure an adequate return on the operational cost of technology.

BACKGROUND OF INVENTION

It is very important for entities to be able to track expenses. A growing portion of many entity's expenditures are related to computers, including costs for computers, peripherals, and support personnel. In the past, entities purchased or leased computers, servers, and the like on a fixed-price basis. That is, an entity would pay a fixed price for the use of a computer, regardless of how much they actually used the computer. An entity would also incur the salary costs for certain people to operate and maintain the computers and the facility costs for housing the equipment.

Recently, a trend has emerged with computing providers selling computing time on a unit basis. In a manner similar to electric companies selling electricity by the amount of electricity used, computing providers sell computing power based on the amount of computing time used. There are various benefits for the users of such a utility type pricing system. For example, entities may have fluctuating needs wherein, one week, the entity may have large computing needs, but the next they may not have large computing needs. In such a situation, under traditional pricing, the entity would be forced to buy enough computers, servers, and the like to cover their peak needs.

Under traditional pricing schemes, during slower times, the computers and servers are not used as often, but payments related to the computers still must be paid. If the entity tries to compensate by purchasing fewer or less expensive computers and servers, they may encounter the opposite problem—they may have adequate computing power during slow times, but inadequate computing power during peak times. If the entity is dependent on adequate computing power being available at all times (for example, the entity runs an e-commerce business or otherwise desires 24-hour access by customers), the lack of computing power may result in lost business to the entity. The utility type pricing scheme reduces these problems, as short-term spikes or dips in computing needs are compensated for by the resultant spike or dip in computing costs.

However, under the utility pricing scheme, it may be more difficult to plan for future costs because, for example, peak times may not always be predictable. Another reason is that it is not always easy to determine how the computing time is being spent and where it is being spent. In addition, with the integration of systems and the evolution of user interfaces, it becomes difficult for users to perceive how much processor time they are using, thus making it easier for a user to inadvertently spend too much on computing. In certain instances, computing providers using utility pricing do not separate costs per job, merely presenting a bill periodically. Therefore, an entity that has a dozen internal groups each using utility pricing may not be able to determine which groups are in need of more computing power or less computing power.

The confusion in reconciling the fees for the computing time is often compounded in a corporate environment where multiple business units have different computing needs in any given month. In these cases, and particularly given the transformation of in-house computing departments to cost centers, the in-house computing departments may want to pass along the fees to the appropriate departments within their company. In addition, these fees are often passed along within the company to the clients being served by the business. For example, a company's client may have agreed to pay for excess computing time to complete a project. In these situations, it is important that the appropriate computing charges and the appropriate fees associated with those charges be accurately reconciled and forwarded to the appropriate department or corporate client. This has been a difficult task for corporate computing departments in some instances because, under the past system, a computing department may manually collect all the fees owed by one corporate entity and forward a monthly lump sum balance owed by the corporation.

A significant amount of computing department intervention is often required to address the aforementioned issues. A computing department may manually input information to identify the fee with the appropriate computer usage. However, there is an increased human error potential and a reduction in the computing department productivity corresponding to the time spent performing this manual transaction. While other billing software products exist, these products do not typically handle fees related to computer usage and the products do not offer enhanced descriptive billing statements, and therefore the computing department receives calls from company divisions requesting additional information to help them understand, validate, and reconcile their fees. Furthermore, existing fee allocation systems lack certain features or have certain deficiencies such as, for example, they generally require manual computing department intervention resulting in poor time efficiency and increased error possibilities; they provide little to no descriptive bill detail resulting in increased corporate division confusion trying to understand their fees and expense them; they are not able to automatically charge fees for value ads, special services, or other computing services and pass the cost for these services to the corporate division; they do not have the flexibility to automatically charge only one flat fee for several computer usages related to one project because they have no user profile to work from; and they do not automatically allow the fee to be charged to an alternate or a split form of payment because they have to bill through the corporate headquarters.

With both traditional pricing models and utility pricing models, it is very important for organizations to limit costs in order to remain competitive in the marketplace. But it is also important to maintain sufficient computing power to be able to handle the variety of different tasks being performed. It is desirable for an entity to be able to more easily track past expenses and forecast future expenditures. A need also exists for billing with enhanced description for facilitating the reconciliation of the fees to the associated computing department. A need also exists for billing that avoids manually breaking out and reconciling computing department fees, and improves computing department efficiency. There further exists a need to directly, systematically, and automatically bill the fees and computing department charges to the appropriate entities.

SUMMARY OF INVENTION

The present invention solves some of the problems in the prior art by identifying the consumption of raw technology resources by an entity in order to track past expenses and forecast future expenditures. The technology consumption may relate to, for example, computer usage, telephony resource usage, manufacturing, and production runs. An exemplary method of the present invention includes receiving billing information from a provider, reading a business model file, then allocating the billing information according to the business model. The business model includes information regarding the business dimensions of the entity, wherein the business dimensions may include, for example, business processes, organizational information, and associated business performance metrics. The organizational information may include groups in which the entity is divided, as well as sub-groups for further subdivision of the business.

The invention also provides a controller for automatically billing a designated account, project, division or third party for fees associated with the computing time, use or other similar services. The system may utilize a rules engine or any other factors for dividing the billings. The system may provide loyalty points for computer usage or accept loyalty points to pay for computer usage. Enhanced descriptive billing statements can be created simplifying the process of reconciling fees to the computing costs. The system may also monitor use in substantially real-time or provide notifications and warnings related to low or excessive use. The system may also compile usage statistics and send out requests for bids to obtain improved financial arrangements or to share usage with other entities.

BRIEF DESCRIPTION OF DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
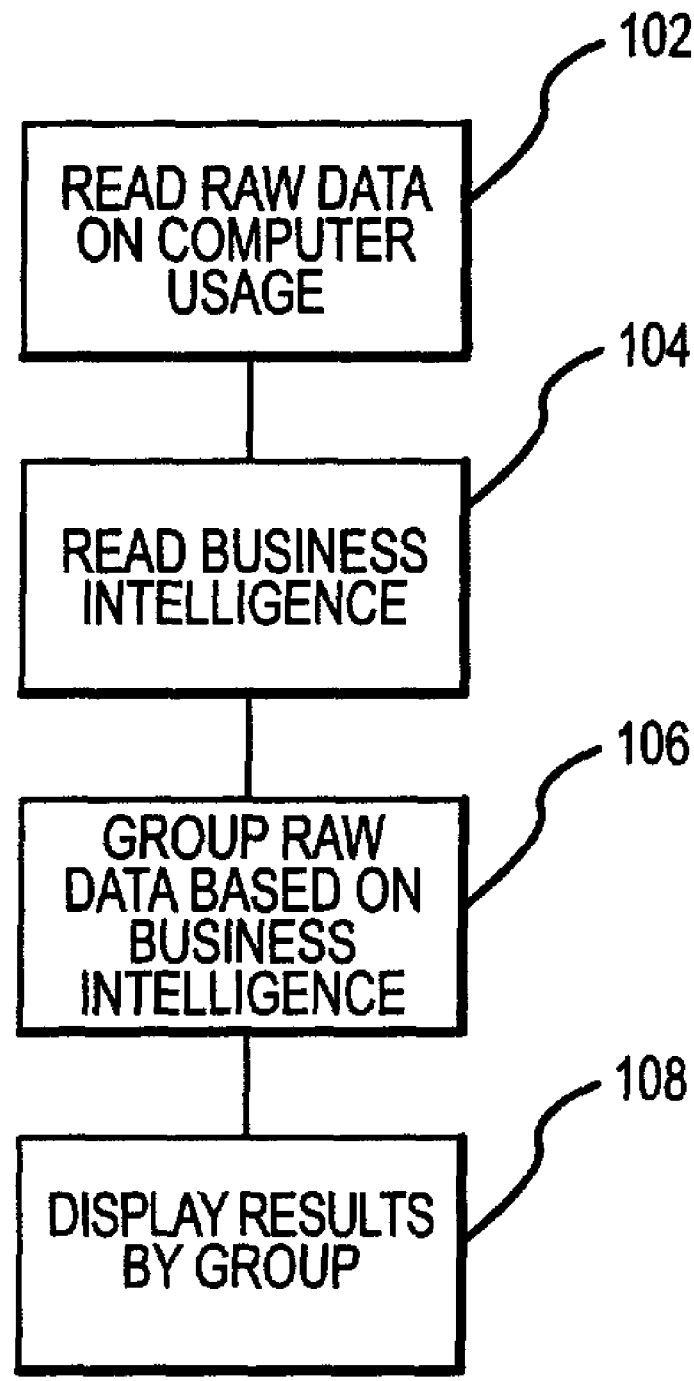
FIG. 1 is an exemplary flow chart illustrating the processing of cost information.

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

In general, the invention facilitates the optimization of the value of operational technology portfolios by helping technology investments to generate an adequate return. The system improves technology infrastructure and reduces the expense base in various ways. For example, the invention identifies the manner through which more detailed raw technology consumption data can be utilized to create value add MIS. The invention also establishes and integrates new data sources at an enterprise level into a cohesive model, thereby linking application level technology consumption to associated business processes and products. In other embodiments, the invention substantiates and improves the current levels of business classification reporting to industry standard classifications for benchmarking. The invention also provides strategic analytics through a self service model which links value/leading business indicators to technology domains. As such, the invention facilitates improving the sophistication of technology and business decision making partners.

The invention also targets the nature of consumption associated with specific lines of business, services and products. As used herein, technology consumption may include, for example, computer usage, telephony resource usage, manufacturing cycles, and production runs. Computer usage may include, for example, utility-priced computing services based on processor usage time (as discussed in more detail below). Telephony usage may include, for example, the management of call centers to determine phone representative allocations, computer networking decisions and the number of T1 lines needed. Production runs may include, for example, the efficiency of product runs as compared to new account orders for the product.

In certain embodiments, the invention includes meaningful indicators to help understand and hence articulate what has caused consumption to either increase or decrease against normal trends. In that regard, the invention helps to gauge a company's effectiveness in comparison to industry peers. The invention also helps a company understand how various business initiatives are supported through technology and at what level of cost of consumption. The system includes a performance reporting mechanism through which business and technology partners perceive a value (not just cost) from technology consumption. In one embodiment, the analysis may be completed with metrics that match the industry (e.g., IBM billing metrics), so the solution may be leveraged by others using a common metrics (e.g., IBM-GS). In addition, the general framework may be leveraged with other metrics as well as a technology management solution for other companies and industries. As such, the invention defines a model for utilizing raw consumption data and associating it with more detailed business classifications to facilitate identifying improvements and to promote an adequate return on technology investment.

Within an entity, there may be distinct groups or departments. Each group or department may have its own computing needs. For example, a technology company may have an accounting group and an engineering group. A financial institution may have a home loan department and a banking department. In addition, internal organization may be geographic in nature. For example, a group may only include European countries or only include various states of the United States. In such a manner, company statistics can be determined on a geographic basis. It is often desirable to determine costs used by each group or department. Within each group or department, there may be one or more subgroups. For example, an engineering group may have several different sub groups, one for each particular job being performed by the engineering group. For example, a semiconductor manufacturer may have different sub-groups for each product being developed. In a similar manner, any entity may have many groups and sub-groups. In one embodiment, with reference to FIG. 3, customer system 10 may include a business organization database or module 14 which stores and tracks the business groups, business logistics and business functions.

A provider of utility-priced computing services (e.g., utility computing provider 5) typically prices its services based on processor usage time, for example, on a CPU-second basis—namely, for each second of processing time used, a fee is charged, typically based on a predetermined schedule. For example, an entity may negotiate with the provider for a charge of $X per second of usage, with the X variable depending on how many total CPU seconds were used or are expected to be used. In such a manner, an entity can negotiate a volume discount or a stepped-type of pricing, wherein usage above a certain number of seconds is at a different rate. Pricing may also be determined by one or more other factors including, for example, volume, peak/off-peak usage, geographic location, services provided, performance expectations, location, service level scoring, CPU cycle, local power consumption costs, physical site security, increased site security, additional operational procedures needed to support increased sensitive data, level of fail over needed, service level agreements, account data privacy requirements, and/or the like.

One problem with such a pricing scheme is that the entities are billed based only on the number of seconds used. One method to minimize such a problem would be to establish a separate account with the provider for each group within an entity. In such a manner, each group has its group expenditures separated from expenditures of other groups and the provider would bill each group separately for computing services. Several disadvantages are presented, however. For example, the use of a separate account for each group reduces the benefits of having only a single bill to pay. In addition, costs within each group are not separated. For example, a group may have multiple projects. Even if costs are separated by group, individual projects within a group are typically not separated. While various embodiments discussed herein relate to computer usage, one skilled in the art will appreciate that the present invention also contemplates the same features and functions for monitoring, identifying, allocating and distributing the costs related to the consumption of any technology resource by an organization.

Figure 3:
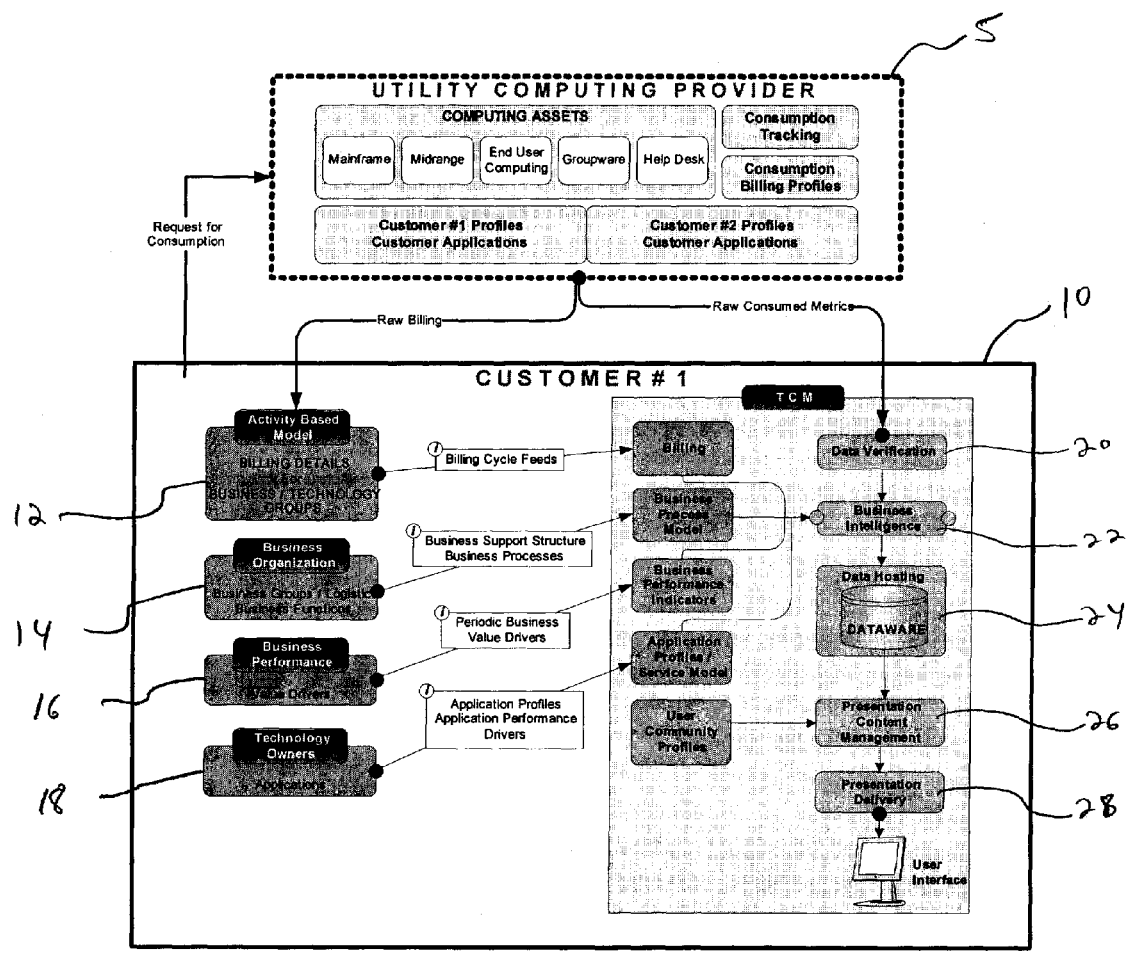

In one embodiment, with reference to FIG. 3, the system may include a utility computing provider 5 and a customer system 10. Utility computing provider may include hardware and/or software suitably configured to provide certain functions or store certain information such as, for example, computing assets, consumption tracking, consumption billing profiles, customer profiles and customer applications. The computing assets of the utility computing provider 5 may include, for example, a mainframe, midrange, end user computing, groupware and help desk hardware and/or software.

In one embodiment, and with continued reference to FIG. 3, customer system 10 may send a request for consumption services to utility computing provider 5. Customer system 10 may receive raw billing and raw consumption metrics from utility computing provider 5. Customer system 10 may include hardware and/or software suitably configured to perform the functions discussed herein such as, for example, activity based module 12, business organization module 14, business performance module 16 and technology owner module 18. Customer system 10 may also include, for example, data verification module 20, business intelligence module 22, data hosting module 24 which may include dataware, presentation content management module 26 and presentation delivery module 28.

In one embodiment, the user communicates with the utility computing provider 5 through a network either directly or via a controller which monitors the services. The controller may be operated by and/or located at the provider of computing services, a third party and/or the user. The controller may be separate software or hardware or the controller may be integrated into any existing billing system. The controller may be similar to known controllers used for controlling the billing and usage related to cellular phones, internet access, utilities (e.g., water, electricity), cable television and the like. The controller may include various databases for storing, searching and analyzing the information or data discussed herein. For example, the controller database may include application profiles, unique identifiers, billing data, business model files, value drivers and the like.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, "Internet Standards and Protocols" (1998); "Java 2 Complete", various authors, (Sybex 1999); Deborah Ray and Eric Ray, "Mastering HTML 4.0" (1997); and Loshin, "TCP/IP Clearly Explained" (1997) and David Gourley and Brian Totty, "HTTP, The Definitive Guide" (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods. See, e.g., Gilbert Held, Understanding Data Communications (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Washington), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like. For a basic introduction of cryptography and network security, see any of the following references: (1) "Applied Cryptography: Protocols, Algorithms, And Source Code In C," by Bruce Schneier, published by John Wiley & Sons (second edition, 1996); (2) "Java Cryptography," byjonathan Knudson, published by O'Reilly & Associates (1998); (3)

"Cryptography & Network Security: Principles & Practice," by William Stallings, published by Prentice Hall; all of which are hereby incorporated by reference.

As used herein, a "user" or any similar term may include a person, entity, division, group, software, hardware, and/or the like. The identifier may include any device, code, number, account, account number, project number, division number, group number, letter, symbol, digital certificate, smart chip, digital signal, analog signal, biometric or other identifier/indicia suitably configured to allow the consumer to access, interact with or communicate with the system or controller such as, for example, one or more of an authorization/access code, personal identification number (PIN), Internet code, other identification code, and/or the like which may optionally be located on or associated with a rewards card, charge card, credit card, debit card, prepaid card, telephone card, smart card, embossed card, magnetic stripe card, bar code card, transponder, radio frequency card or an associated account. The account number may be distributed and stored in any form of plastic, electronic, magnetic, radio frequency, wireless, audio and/or optical device capable of transmitting or downloading data from itself to a second device. The identifier may be unique or similar to other identifiers. The identifier may include corporate billing information as part of the code or the identifier may include more than one identifier (e.g., corporate purchase order number and cost center number).

With reference to FIGS. 1 and 3, a flowchart illustrating the operation of a system of the present invention is shown. A computing provider 5 supplies its raw billing data to the system (step 102). The raw billing data includes all the computing time used by the entity during a certain time period. This data may be organized by jobs, wherein each specific job executed by the computing provider is individually tracked and reported by the computing provider to the system of the present invention. Thereafter, the system reads a "business model" file from business organization module 14 that contains data as to how the business that incurred the costs is organized (step 104). The raw data is then grouped according to the business model (step 106). Thereafter, the data, now sorted according to the internal organization of the entity, can be displayed using presentation content management module 26 and presentation delivery module 28 (step 108) or used in a variety of different manners.

Figure 2:
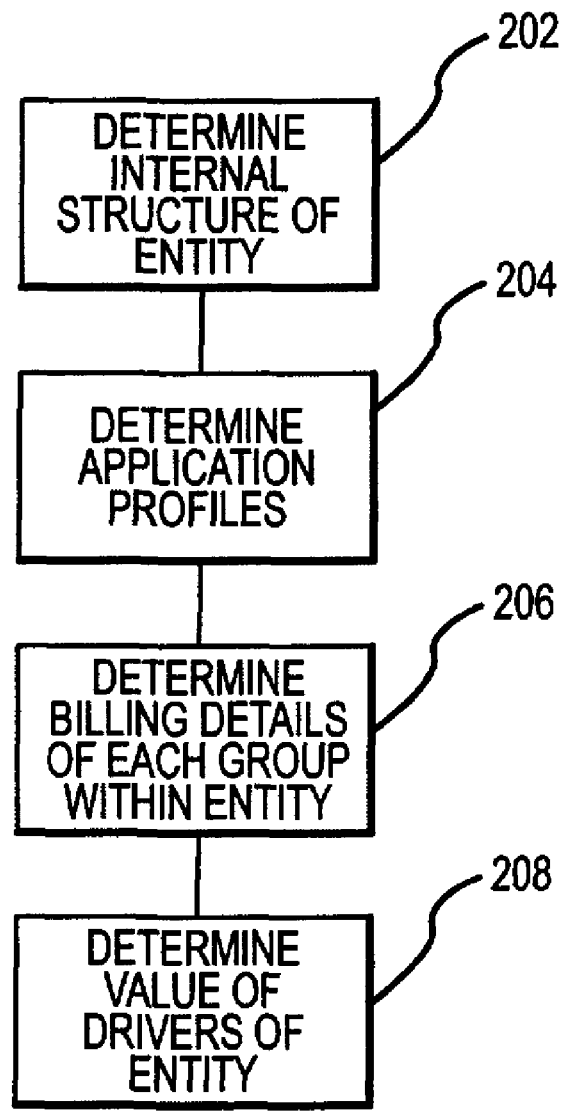
FIG. 2 is an exemplary flow chart illustrating the creation of a business model file; and, FIG. 3 is an exemplary system diagram of the present invention.

With reference to FIGS. 2 and 3, further explanation is provided as to the creation of a business model file. The business model file contains the various business dimensions of the entity. The customer system 10 may utilize business organization module 14 to determine the internal structure of the entity (step 202) which may entail determining the groups within the entity and how each group is organized. As described above, an entity may have several major groups such as an engineering group and an accounting group. Each group may be further divided into sub-groups. For example, an accounting group may be divided into accounts payable and accounts receivable. The entity may be divided into as many groups and sub-groups as the entity desires, in order to make a more accurate depiction of expenditures. This determining step is typically performed by the entity and promulgated to a system of the present invention.

Technology owner module 18 of customer system 10 may then determine the application profiles and/or application performance drivers (step 204). For example, each group and sub-group have certain tasks performed by the computing provider. The application profiles identify each task with a group or sub-group. Typically, processor usage time is associated with a unique identifier. In turn, the application profiles associate each unique identifier with a group or subgroup. In a similar manner, expenses for products under traditional pricing models can also be divided among groups and subgroups according to which group or sub-group incurred the expenses.

As set forth in more detail below, activity based module 12 of customer system 10 determines the billing details of each group and sub-group within the entity (step 206). The billing details include how each group and sub-group from business organization module 14 use computing services. For additional information related to allocation of fees and detailed statements, see, for example, U.S. Ser. No. 09/904,965, filed on Jul. 13, 2001, and entitled "Fee Allocator System And Method", which is hereby incorporated by reference.

With continued reference to FIG. 2, business performance module 16 then gathers the value drivers of the entity from the entity (step 208). The customer system uses the value drivers and incorporates periodic business value drivers to create business performance indicators. Value drivers are the criteria used by the entity to determine if they are successful. For example, one company may consider cost per transaction to be very important, especially for future expansion purposes. In contrast, another company may be more concerned with total costs incurred.

Once all the information is gathered, the business model is stored and used as described above. In particular, while the various jobs performed by the computing provider are assigned a unique identifier, those unique identifiers are not otherwise used by the computing provider, which only provides a bill for the total services provided. Using the business model, an embodiment of the present invention is able to determine exactly how much computing time was used by each group and sub-group within an entity. In addition, an organization using an embodiment of the present invention is able to examine technology operational costs in the various groups allowing the organization to make a more informed, value-based decision regarding its technology portfolio.

After all the above processes have been performed, the costs can be analyzed and it can be determined if too much CPU time is used for certain tasks. For example, the benefits of running a weather simulation every 15 minutes may be outweighed by the costs incurred in running the simulation that often. For a financial institution processing credit card authorizations, it may be determined that performing a credit card authorization for purchases below a certain amount (e.g., $25) may not be cost effective in terms of the number of determinations of non-authorizations.

In addition, the costs can be presented in a variety of different manners using, for example, presentation content management module 26 and presentation delivery module 28. For example, the costs can be displayed graphically, such that a meaningful comparison of costs can be made. Such comparisons can be across different groups and sub-groups or such comparisons may be within group or sub-group, comparing costs during different time periods. In addition, costs can be presented in a format that allows easy data manipulation. For example, the costs can be translated into a spreadsheet format such that a user can examine the costs using tools of his preference.

In another embodiment, with reference to FIG. 3, activity based module 12 receives the raw billing data from utility computing provider 5, combines or compares the raw billing data with billing cycle feeds, then the information is consolidated into a billing module within customer system 10. Business organization module 14 uses one or more of the business group, business logistic and business functions, and combines or compares the information with business support structure and business processes, then the information is consolidated into the business process model. Business performance module 16 combines or compares value drivers with periodic business value drivers, then the information is consolidated into the business performance indicators. Technology owner module 18 combines or compares applications with application profiles and application performance drivers, then the information is consolidated into the application profiles and service module. Moreover, data verification module 20 receives and verifies the raw consumed metrics from utility computing provider 5 and sends this information to the business intelligence module 22. Business intelligence module 22 incorporates the verified raw consumed metrics with billing, business process model, business performance indicators, application profiles and service models. Business intelligence module 22 sends the information to data hosting module 24 wherein the dataware manipulates and/or organizes the data. Data hosting module 24 then sends the data to presentation content management module 26, which in turn incorporates the information with the user community profiles. The presentation delivery module 28 receives the information and is suitably configured to present the information to the user interface.

The present invention also provides a system for automatically dividing the billing for fees associated with the computing time, use or other similar services among any designated account, project, process or division. The user may initially provide the controller with information related to business model files, application profiles and/or value drivers. As briefly set forth above, the controller may utilize the business model files, application profiles and/or value drivers to associate an identifier with an account, project, process, or division such that the computing time is allocated to the particular identifier.

For any user which desires computing time, the system may request that the user submit an identifier. For example, a user may submit an identifier which includes his charge card number such that the computing time is billed directly to the charge card. In another embodiment, the user may submit a corporate account number or a project number such that the computing time is billed to the corporation, but a portion of the time is billed to the specific project being completed by the corporation. In another embodiment, the controller automatically recognizes the project or group based upon the pre-existing business model files, application profiles and/or value drivers. For example, the controller may recognize an email address, computer identification, user name or any other user information, then automatically assign the billing related to the associated computing time to a particular identifier. In another example, the controller may recognize that any computing usage during a particular time period is automatically assigned to a particular identifier.

Similarly, the controller may determine the allocation of billing based on levels of users, geographic areas, projects, zones and the like. For example, if the user is a Vice-President, the computing time may be allocated to a corporate identifier. However, if the user is a programmer, the computing time may be allocated to a particular project. Similarly, the computing time may be allocated to a Southeast business unit when the user is a programmer using a computer in New Orleans, and the computing time may be allocated to a Northwest business unit when the user is a programmer using a computer in Seattle.

The controller may also be configured to allocate computer usage billings to third party customers or providers. For example, if a third party accounting company (e.g., Coopers Lybrand) is using General Electric's computing time to fix or install new accounting software for General Electric, General Electric may request that the controller bill the Coopers computing time directly to Coopers.

The controller may also include a rules engine. The user may provide rules, algorithms or guidelines for the rules engine or the rules engine may create rules. The rules may be established dynamically, in substantially real-time, in a batch process, for a certain project, for a certain time period, a certain business unit and the like. The rules may determine how the controller divides the billings or provides other features or services as discussed herein (e.g., switching usage providers, restricting usage). The controller may notify any user of the rules that will be or have been implemented for particular computer usage. For example, the rules may establish that any computer usage below 25 hours is billed to a corporate account, computer usage above 25 hours is billed to the particular project and any computer usage above 50 hours must obtain prior approval from a higher level of employee. In this regard, when computer usage approaches 50 hours, the controller notifies a corporate officer (as described herein) and restricts additional computer usage until a corporate officer submits a special identifier to the controller. The controller may also notify the user when the computer usage reaches 25 hours, so the user knows that the usage will soon be billed to the particular project.

The controller may be suitably configured to implement a loyalty program or accept loyalty points for payment. With regard to implementing a loyalty program, the controller may include any software and/or hardware for allowing users to earn or redeem loyalty points. The points may be earned by the person using the computing time and/or the person's company. The points may also be "assigned" to a third party such as a charity. The controller may incorporate the loyalty program or interface with a third party loyalty program. The controller may request an additional identifier associated with the system or any other third party loyalty program identifier. For example, the system may provide American Express Membership Rewards points or American Airlines Advantage Miles to companies that use any amount, a predetermined amount or any other type of computer usage discussed herein. In one embodiment, the system may provide an increased amount of loyalty points for computer usage during low usage times (e.g., nighttime) to provide an incentive to obtain the computer services at the low use hours. The system may also provide multiples of points (e.g., double points) to provide other incentives. The loyalty points may be related to a geographic area in that computer usage in Dallas may result in the user obtaining Dallas loyalty points. The system may store the computer usage loyalty points in a loyalty account associated with each identifier or user. Alternatively, the system may report allocations of loyalty points to a third party database in substantially real-time, batch mode or any other time frame.

The system may also accept or redeem loyalty points. In one embodiment, the redemption request may include loyalty points earned from computer usage time. In another embodiment, the user may use loyalty points from other loyalty programs to purchase additional computer usage time or any other goods or services from the system. In other embodiments, the system may accept a combination of loyalty points issued by the system and third party loyalty points. The system may convert the loyalty points to a monetary value such that the provider of computing time receives a monetary value. The system includes facilitating the transfer, gifting and/or pooling of loyalty points between accounts. In an exemplary embodiment, the system includes facilitating the substantially real-time transfer of loyalty points between accounts. The transfer may include a deduction from a first account and a crediting of a second account with any type or portion of points (or points converted to another geographic designation). Moreover, the transfer may involve any portion of the points transferred in substantially real-time, certain points transferred in a batch transfer, certain points transferred upon a triggering event, certain points transferred over time and/or certain points transferred upon satisfaction of a condition or rule. In one embodiment, the system includes any hardware and/or software discussed herein or known in the art suitably configured for receiving a transfer request (e.g., user request, triggering event, etc) for a transfer of a any portion of loyalty points, accessing and analyzing the total number of a certain type of all of loyalty points in the transferor account to determine if a sufficient number of points exist, analyzing the type/level of user and type/level of points to be involved in the transfer, determining if any rules exist for restricting or limiting the transfer of points, using a conversion engine to convert the point value or geographic area designation to an appropriate point value or geographic area designation in the transferee account, deducting the requested loyalty points from the transferor account, and increasing the point balance in the transferee account.

The system also creates enhanced descriptive billing statements which may, for example, simplify the process of reconciling fees to the computing usage costs. The billing statements may include any of the information discussed herein. For example, the billing statements may include on or more of the following: total computer usage time, computer usage time associated with each identifier, account, project, process or division, time periods of computer usage, users associated with the computer usage during any or all of the time periods, authorizations received, rule engine guidelines used during the computer usage, notifications sent by the controller, accounts billed for the usage, processing power associated with each usage, provider providing the computing time, computer usage and billings associated with business model files, application profiles or value drivers, and any analysis, statistics or graphical display of usage or billings.

The system may also monitor computing time usage in substantially real-time, any pre-established time period or any random period. The monitoring of usage and requests for usage may result in notifications and/or warnings related to low or excessive use. The notifications may be via phone, email, pager, cell phone, personal digital assistant, fax or any other communication method discussed herein. The notifications may include a simple message, detailed data, or a signal (e.g., audible, visual, mechanical, etc). For example, a computer screen may start to flash when usage levels exceed a pre-defined amount of time for a certain project. Additionally, the computer may activate a signal when the usage costs are changed at a certain time of day (e.g., lower usage costs after 7 p.m.). In another embodiment, a computer screen may include a clock which indicates the total usage for a project by all computers, usage by the individual computer and/or usage by the person operating the computer at the specific time. In this regard, the system may request that any user first input any of the identifiers discussed herein to allow the system to track the user at any computer which interfaces with the system and to enable the computer to display the usage time associated with the identifier. Similarly, the system may include a project identifier, a group identifier, a geographic identifier, a process identifier and/or the like. For example, the system may include a plurality of clocks which each indicate a different amount of time utilized by a person, by a group in which the person is a member, by the geographic team of which the person is a member, etc. In other words, a person may be part of a group from around the world which is re-configuring accounting software, but the same person may be part of a team of programmers in India, wherein the team is trying to keep computer usage time to a minimum during the nighttime hours (when the USA part of the team is using the computer time). The display may not only show the amount of computer usage time, but the display may also (or alternatively) convert the usage time to a monetary or dollar value such that the user may appreciate the real costs for different projects (especially when different projects are billed at different fees for the same computer usage time). The system may limit the notifications or display of information to certain types of users depending, for example, on the classification of the users. In one embodiment, the system may display personal usage time to a programmer, but the Vice-President may be able to view total project usage time and usage time in different geographic regions.

The system may also provide data analysis and compile usage statistics. The "data analysis", as used herein, shall be understood to comprise quantitative and qualitative research, statistical modeling, regression analyses, market segmentation analyses, econometrics, and/or the like. Such analyses may be used to characterize a user, predict a user's behavior, and/or correlate any of the data discussed herein. The system may acquire information related to providers of computer usage time and utilize the value drivers, business models, expenditures and the like to determine if the user is optimally utilizing computing time. For example, if the user is purchasing computing time during the daytime hours which is three times as expensive as nighttime hour computing time, the system may suggest to the user that the user batch process the transactions that require the purchased computer time and process a large portion of the transactions at nighttime hours when the computer usage rates are lower. The system may conduct further analysis and determine that it may be more efficient or cost effective to process transactions valued at over $10,000 in substantially real-time during the day at the higher rates because the substantially real-time processing reduces fraud by a factor greater than three times the computer usage cost. In another embodiment, the system may transfer a certain portion of processing needs to another computer usage provider that provides lower rates during certain desired time periods. The system may restrict or set rules on computer usage during certain time periods when usage rates are high, other users are utilizing the computer processing power, spikes or dips in usage (e.g., in substantially real-time), more loyalty points are available and the like.

After determining computer usage needs of one or more users (or upon user request), the system may send out requests for bids to obtain improved financial arrangements from computer usage providers. The system may enroll the user with many providers of computing services such that the system may obtain bids from numerous providers without the need to enroll the user with each provider request for quote system. For additional information related to the request for quote system, see, for example, Ser. No. 09/934,818 by Anne O'Malley, et al., filed on Aug. 22, 2000, and entitled "Method And Apparatus For Enrolling With Multiple Request For Quote Providers", which is hereby incorporated by reference. The system may also incorporate or access software and hardware which is suitably configured to conduct a reverse auction for suppliers willing to provide bids for certain usage volume or certain time periods.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

The invention claimed is:

1. A method comprising:
receiving, by a computer based system for allocating billing data corresponding to usage of a technology resource, raw billing data on behalf of a group within an internal structure within an entity, wherein the raw billing data is associated with usage by the technology resource;
wherein the usage is assigned a unique task identifier configured to identify a specific project processed by the technology resource,
wherein the group is assigned a distinct group identifier,
receiving, by the computer based system, descriptive data corresponding to the unique task identifier;
receiving, by the computer based system, gain from the investment associated with each task identifier;
allocating, by the computer based system, the raw billing data to the group based on usage of the technology resource by the group, wherein the allocating further includes allocating loyalty points to the entity based on usage of the technology resource;
reducing, by the computer based system, the allocated billing by a monetary value of redeemed loyalty points; and
determining, by the computer based system, return on investment analysis of each project completed.

2. The method of claim 1, wherein the technology resource includes at least one of telephony resource usage, manufacturing cycles, production runs, and computer usage, wherein the computer usage includes computing time obtained from an outsourced provider.

3. The method of claim 1, further including reporting, by the computer based system, a business performance indicator, wherein the business performance indicator is based on the received criteria and the raw billing data.

4. The method of claim 1, further including automatically recognizing, by the computer based system, at least one of the distinct group identifier and the unique task identifier.

5. The method of claim 1, wherein the allocating further includes at least one of transferring, pooling and gifting loyalty points.

6. The method of claim 1, further including providing, by the computer based system, a descriptive billing statement including the unique task identifier and the distinct group identifier.

7. The method of claim 2, further including providing, by the computer based system, a descriptive billing statement including at least one of:
- a total of computer usage time,
- the computer usage time associated with at least one of: unique identifiers, an account, a project, a process and a division,
- a time period of the computer usage,
- at least one entity associated with the computer usage occurring during the time period,
- an authorization received,
- a rule engine guideline used during the computer usage,
- a notification sent by a controller,
- an account billed for the computer usage,
- a processing power associated with the computer usage,
- a provider providing the computer usage time,
- the computer usage and the allocated billing associated with at least one of a business model file, an application profile, and a value driver,
- an analysis of at least one of the computer usage and the allocated billing,
- statistics of at least one of the computer usage and the allocated billing, and
- graphical display of at least one of the computer usage and the allocated billing.

8. The method of claim 1, further including adjusting, by the computer based system, the allocated billing based upon at least one of a CPU-second used, a total CPU-seconds expected to be used, a volume discount, a stepped-type of pricing, a peak/off-peak usage, a geographic location, a service provided, a performance expectation, a location, a service level scoring, a CPU cycle, a local power consumption cost, a physical site security, an increased site security, an additional operational procedure needed to support increased sensitive data, a level of fail over needed, a service level agreement, and an account data privacy requirement.

9. The method of claim 2, further including: monitoring, by the computer based system, the computer usage; and notifying, by the computer based system, the group of the computer usage.

10. The method of claim 9, wherein the monitoring the computer usage further includes monitoring in at least one of substantially real-time, a pre-established time period and a random time period.

11. The method of claim 9, wherein the notifying the group further includes notifying the group via at least one of phone, email, pager, cell phone, personal digital assistant, and fax.

12. The method of claim 9, wherein the notifying the group further includes providing at least one of a signal, a usage clock, and a monetary usage value to the group.

13. The method of claim 9, further including performing data analysis of the computer usage using an application performance driver.

14. The method of claim 9, further including suggesting a cost efficient usage practice.

15. The method of claim 9, further including requesting a bid based upon said monitoring step.

16. The method of claim 1, further comprising receiving by the computer based system, a business model file including at least one of an application profile, a value driver, a user level, a geographic area, a project, a zone, a third party provider, loyalty information and a rule.

17. A tangible non-transitory computer-readable storage medium having stored thereon sequences of instruction, the sequences of instruction including instruction which when executed by a computer-based system for allocating billing data corresponding to usage of a technology resource causes the computer-based system to perform operations comprising:
- receiving, by the computer-based system, raw billing data on behalf of the group within an internal structure within an entity, wherein the raw billing data is associated with usage by the technology resource;
- wherein the usage is assigned a unique task identifier configured to identify a specific project processed by the technology resource,
- wherein the group is assigned a distinct group identifier,
- receiving, by the computer-based system, descriptive data corresponding to the unique task identifier;
- receiving, by the computer-based system, gain from the investment associated with each task identifier;
- allocating, by the computer-based system, the raw billing data to the group based on usage of the technology resource by the group, wherein the allocating further includes allocating loyalty points to the entity based on usage of the technology resource;
- reducing, by the computer based system, the allocated billing by a monetary value of redeemed loyalty points; and
- determining, by the computer-based system, return on investment analysis of each project completed.

18. A computer based system for allocating billing comprising:
- a processor for allocating billing data corresponding to usage of a technology resource ; and
- a memory in communication with the processor, the memory for storing a plurality of processing instructions for directing the processor to:
  - receive, by the processor, raw billing data on behalf of the group within an internal structure within an entity, wherein the raw billing data is associated with usage by the technology resource;
  - wherein the usage is assigned a unique task identifier configured to identify a specific project processed by the technology resource,
  - wherein the group is assigned a distinct group identifier,
  - receive, by the processor, descriptive data corresponding to the unique task identifier;
  - receive, by the processor, gain from the investment associated with each task identifier;
  - allocate, by the processor, the raw billing data to the group based on usage of the technology resource by the group, wherein the allocating further includes allocating loyalty points to the entity based on usage of the technology resource;
  - reduce, by the processor, the allocated billing by a monetary value of redeemed loyalty points; and
  - determine, by the processor, return on investment analysis of each project completed.

* * * * *